Figure 1:
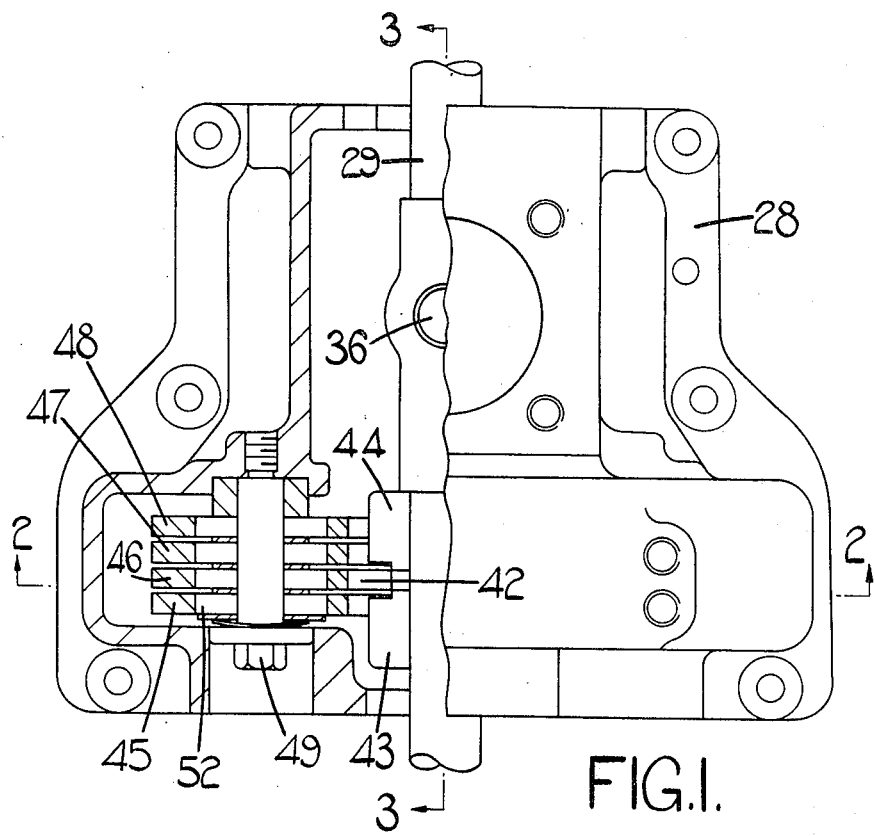

United States Patent [19]
Morrison

[11] 3,857,299
[45] Dec. 31, 1974

[54] CONTROL MECHANISMS FOR GEAR BOXES

[75] Inventor: William McKenzie Meek Morrison, Wolverhampton, England

[73] Assignee: Turner Manufacturing Company Limited, Wolverhampton, Stafford, England

[22] Filed: Mar. 1, 1973

[21] Appl. No.: 337,097

[30] Foreign Application Priority Data
Mar. 17, 1972 Great Britain.................. 12534/72

[52] U.S. Cl. ............................... 74/473 R, 74/475
[51] Int. Cl. ............................................ G05g 9/00
[58] Field of Search........... 74/473 R, 475, 477, 335

[56] References Cited
UNITED STATES PATENTS
| | | | |
|---|---|---|---|
| 2,800,033 | 7/1957 | Zittrell............................ | 74/475 X |
| 3,164,030 | 1/1965 | Fodrea et al..................... | 74/475 X |
| 3,587,351 | 6/1971 | Keller et al. ..................... | 74/477 X |

Primary Examiner—Samuel Scott
Assistant Examiner—F. D. Shoemaker
Attorney, Agent, or Firm—Balogh, Osann, Kramer, Dvorak, Genova & Traub

[57] ABSTRACT

A control mechanism for a gear box comprises a body in which is mounted a control rod which can be moved axially as well as angularly by means of an external control lever, the control rod carrying an actuating member arranged to engage with one of a number of independently movable plates arranged transversely of the length of the control rod axial movement of the rod between successive positions aligning the actuating member with respective ones of said plates and angular movement of the rod causing the actuating member to produce linear movement of the plate aligned therewith and the plates being connected to operating elements arranged to engage gear ratios selector devices in the associated gear box.

13 Claims, 11 Drawing Figures

CONTROL MECHANISMS FOR GEAR BOXES

This invention relates to gear boxes providing a number of selectable ratios between an input and an output shaft, and to control mechanisms for selecting such ratios.

Manual control of gear boxes is usually accomplished by a control lever which, through a selector linkage, actuates any one of a number of members which are arranged in turn to actuate respective clutches or to move gears into or out of mesh. However, it is customary to provide a control mechanism which is designed around the specific requirments of each type of gear box such as the number of gears that can be selected and also the form and position of the manual control lever. With present day arrangements, therefore, a new design of control mechanism is required not only for each new gear box design but also for each variant of each gear box, for example, four or five speed variants of one type of gear box. Where the gear boxes are used in motor vehicles, in particular the number of variants of any gear box, to suit different vehicle manufacturers, may be very large.

The object of this invention is to provide a control mechanism for a gear box which is adaptable for varying requirements.

In accordance with the invention a control mechanism for a gear box comprises a body, a control rod in the body and connectible to an external control lever, the control rod carrying an actuating member and being movable angularly as well as axially in the body, the body containing a number of independently movable plates which are arranged transversely of the length of the control rod, axial movement of the rod between successive positions serving to align the actuating member with respective plates, and angular movement of the rod causing the actuating member to produce linear movement of a plate which is aligned therewith, the plates having respective operating elements arranged to engage gear ratio selector devices in the gear box.

Figure 2:
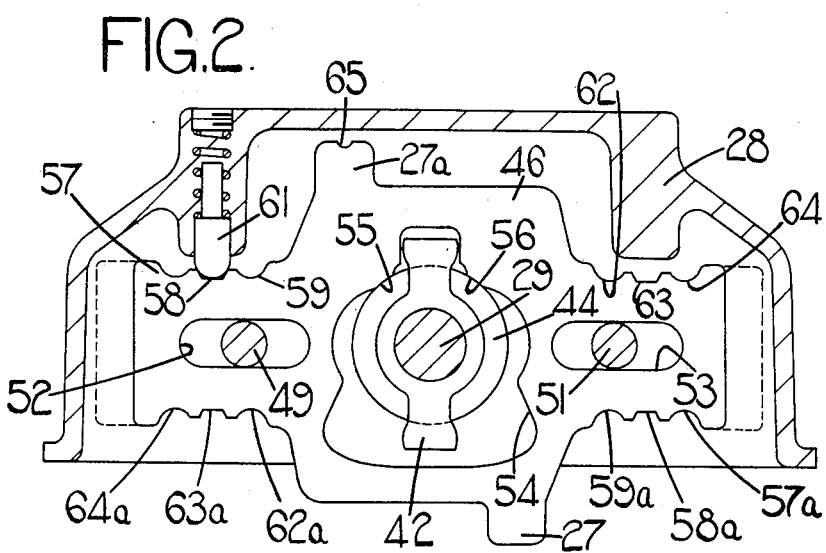
Figure 3:
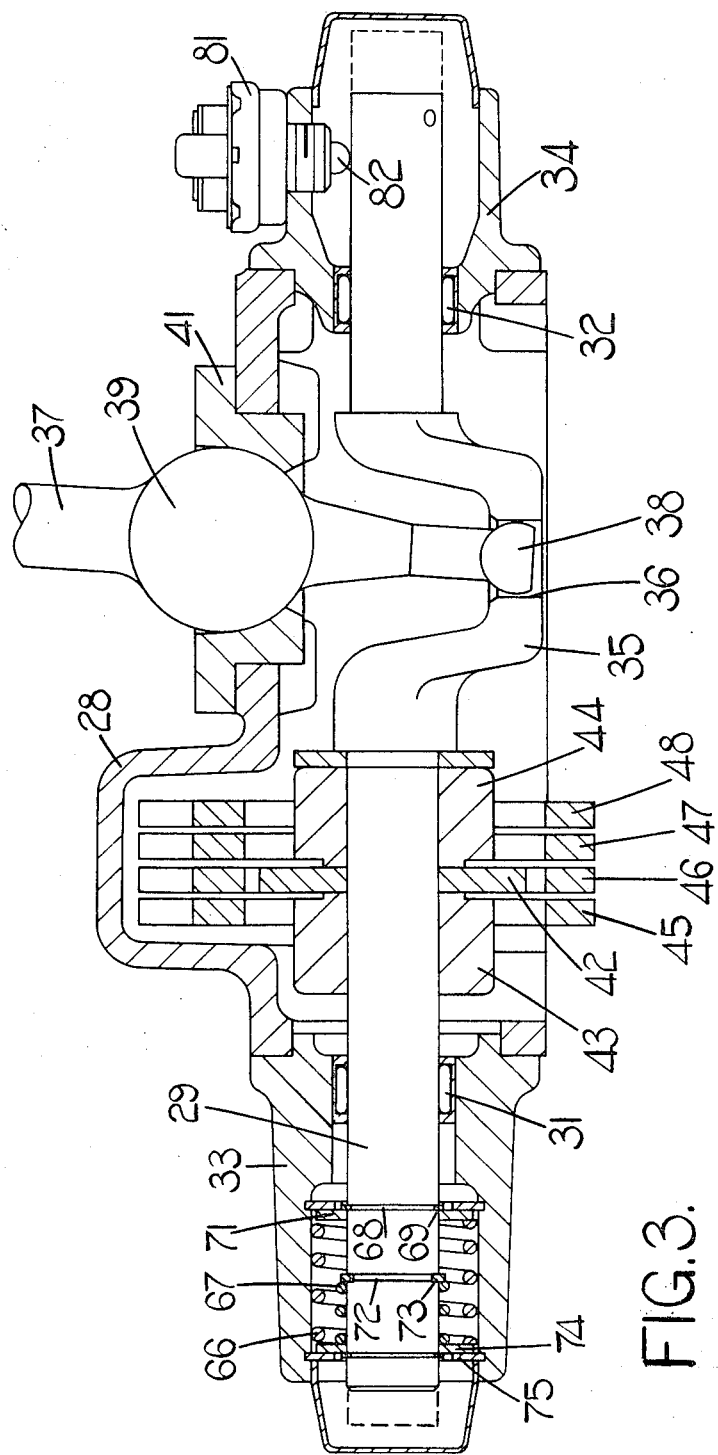
Figure 4:
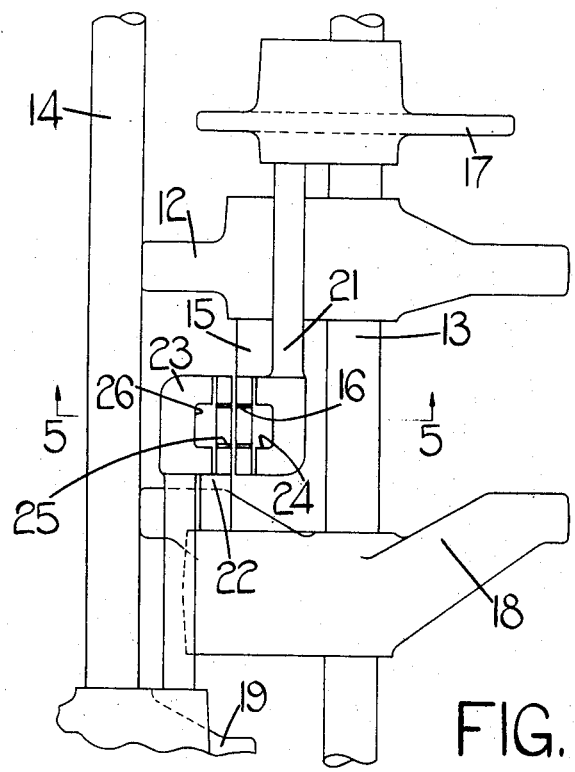
Figure 5:
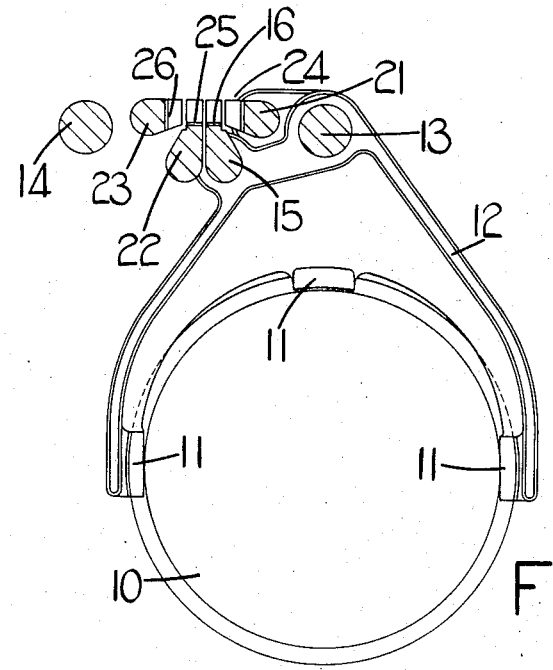
Figure 6:
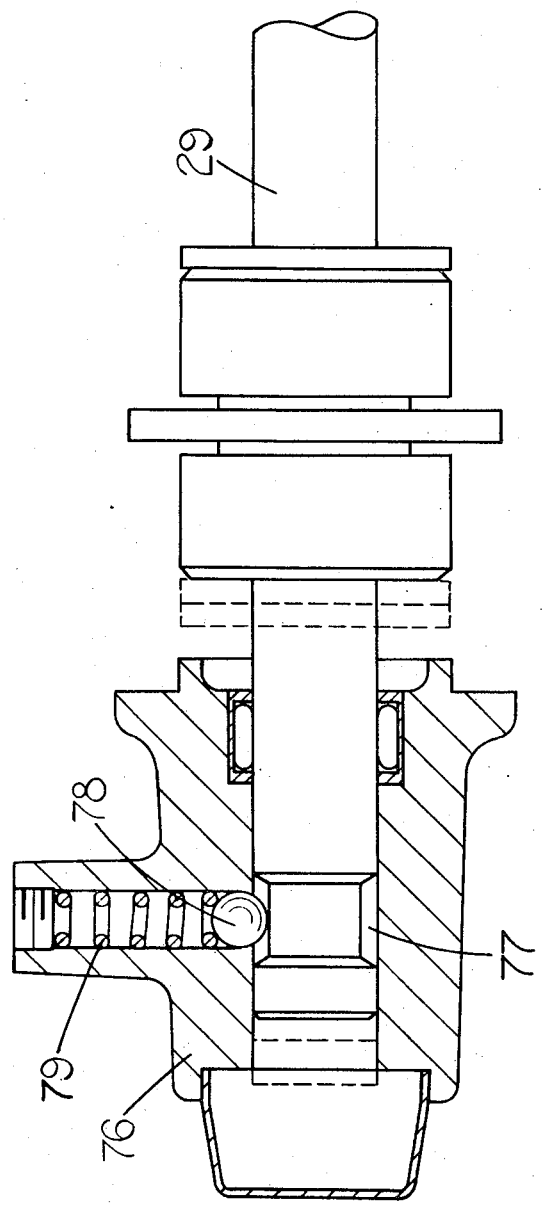
Figure 7:
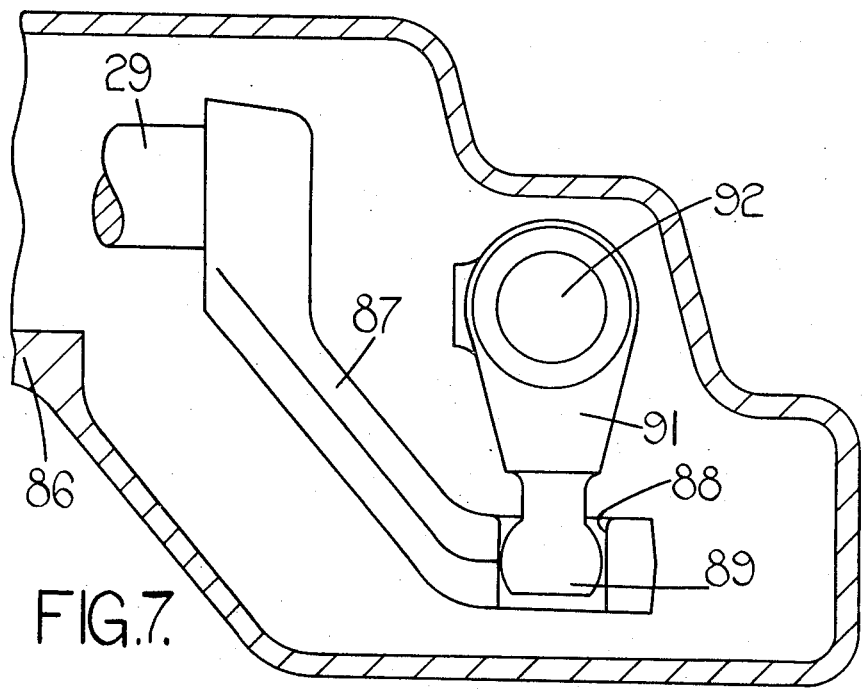
Figure 8:
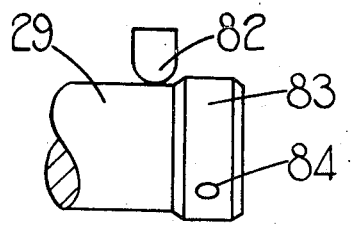
Figure 9:
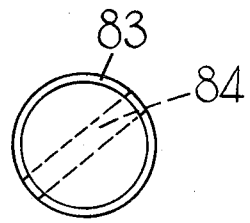
Figure 10:
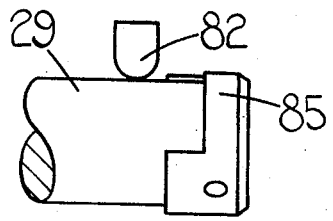
Figure 11:
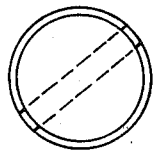

The invention will now be described by way of example with reference to the accompanying drawings in which FIG. 1 is a plan view partly in section of a control mechanism for a gear box constructed in accordance with the invention, FIG. 2, is a sectional view of the mechanism on the line 2 — 2 in FIG. 1, FIG. 3, is a sectional view of the mechanism on the line 3 — 3 in FIG. 1, FIG. 4, is a plan view of actuating mechanism within a gear box with which the control mechanism is associated, FIG. 5, is a cross sectional view on the line 5 — 5 in FIG. 4, FIG. 6, is a fragmentary view of an alternative end portion of the control mechanism, FIG. 7, is another alternative end portion of the control mechanism, FIG. 8, is a fragmentary view in side elevation of an end of the control rod within the mechanism and FIG. 9, is an end view of the portion shown in FIG. 8, FIG. 10, is a side view of an alternative end of the control rod and FIG. 11, is an end view thereof.

The control mechanism illustrated is intended for use with a gear box of the kind having a selector linkage, which will be further described and which is shown in FIGS. 4 and 5, wherein respective gear ratios can be selected. The control mechanism however, is so designed that it can be used for selection of gears in any one of a number of different gear boxes. Such different gear boxes may provide different numbers of speed ratios and may differ also in torque transmitting capacity as well as selector principle.

However, the mechanism is principally designed for use with gear boxes of the kind described and claimed in the Complete Specification of British Pat. No. 36,417/70. In this gear box, there is an input shaft and a coaxial output shaft and a lay shaft extending parallel to said input and output shafts. The lay shaft has gears non-rotatably fixed on it and the input shaft has gears rotatably mounted upon it. Each lay shaft gear has one of the input shaft gears meshing with it. Clutches are provided for selectively engaging the input shaft with the gears upon it so that any pair of gears can be used to transmit torque from the input shaft through the lay shaft and through permanently meshing gears fixed on the lay shaft and on the output shaft respectively.

Gear selection is therefore by means of clutches which are actuated by moving portions of them lengthwise of the input or the lay shaft. FIG. 5, shows one of the clutches in diagrammatic form identified at 10. The clutch includes a part having an external annular groove in which are located three pads 11 supported upon a fork 12. The fork is in turn mounted upon one of a pair of rods 13, 14 fixed in the casing of the gear box. The fork 12, can slide lengthwise of its supporting rod 13.

Fixed to the fork 12, at a position off-set from the axis of the rod 13, is a member 15, in the form of a short arm with its end laterally slotted at 16. As shown in FIG. 4, the gear box contains a plurality of forks similar to the fork 12, three of them being identified in FIG. 4, at 17, 18 and 19 respectively. Furthermore, to each of the forks is fixed an arm 21, 22, 23 respectively. These are slotted laterally like the arm 15, at 24, 25 and 26 respectively. The slots are in the neutral position of the gear box aligned as shown in FIG. 4.

To select gears, the forks are moved lengthwise of their respective rods 13 or 14 through the arms 15, 21, 22 or 23 respectively. Moreover, gear selection is accomplished by movement from the neutral position shown in either of two opposite directions.

The control mechanism whch is shown in the drawings is intended to actuate the arms 15, 21, 22, 23 to select gears and therefore provides four tongues, one of which is shown in FIG. 2, at 27 which are located in the slots 16, 24, 25 and 26 respectively in the arms.

The control mechanism comprises a body 28, adapted for securement upon the top of a gear box. The body 28 carries a control rod 29, supported in two bearings 31, 32 in respective end caps 33, 34 of the body.

The control rod has a cranked portion 35, in which is an opening 36, at a position off-set from the axis of the control rod 29. Engaging in the opening 36, is a part-spherical portion 38 of a control lever 37. Intermediate the ends of the control lever 37 is a further spherical portion 39 engaging in a seating formed in a ring 41, located in an opening in the body 28, of the mechanism. The control lever has its outer end positioned for manual control either directly or through an intermediate linkage.

The control rod 29, has non-rotatably fixed to it, a member 42, having two diametrically opposite radial extensions. This member 42, is fixed to the control rod 29, between two externally cylindrical sleeves 43, 44.

Located in the body 28, of the mechanism, are four identical parallel plates 45, 46, 47, 48. These plates are slidably supported in the body on two spaced bolts 49, 51, passing through straight coplanar slots 52, 53 in the plates respectively.

The plates, as shown in FIG. 2, each have a thistle shaped opening 54, through which the control rod 29 passes. The slots 52, 53 are moreover, positioned at either side of the thistle shaped opening 54, and the centres of the bolts 49, 51 and the plane of the slots also passes through the centre of the control rod 29.

The control rod 29 is movable axially and can take up positions wherein its member 42, is aligned with any one of the four plates 45, 46, 47, 48. The thistle shaped opening 54 in each plate is provided with a narrow portion corresponding with the stem of the thistle, arranged to engage one of the extensions of the member 42, while the other extension occupies a position in the wider end of the thistle. The portion of the thistle shaped opening 54, adjacent to the said narrow portion thereof, provides a pair of shoulders 55, 56, which are spaced from the centre of the control rod 29, to accept and engage with the cylindrical sleeves 43, or 44.

Thus, when the member 42 on the control rod 29, occupies a position in alignment with one of the plates, such as the plate 46, as illustrated, the other plates are located not only by the bolts 49 and 51, but also by engagement of their shoulders 55, 56, in the thistle shaped opening 54, with the cylindrical sleeves 43 or 44.

The control rod 29 can move not only axially, but also angularly. Angular movement of the control rod causes the member 42 also to move angularly. One of the plates such as 46, with which the member 42 is aligned, is moved linearly by such angular movement. Such linear movement can take place to either side of the central position indicated. The plate has in its edge, three notches 57, 58, 59, the centre one 58, of which is angular and the outer two 57 and 59 are approximately semi-circular. A spring loaded detent 61, is located in a portion of the body 28, adjacent the notches 57, 58 and 59. The detent has a hemispherical end which is engageable in any one of the three notches. Annular movement of the control rod 29 can thus cause the plate to occupy any one of three positions. The plates also each have tongues 27, formed integrally on their edges, the tongues extending into the slots 24, 16, 25, 26 respectively of the selector linkage already described.

As shown in FIG. 2, the plate 46 has an associated detent 61 at one side of the centre of the mechanism. The plate 48 has a similar detent in a position spaced from the detent shown but on the same side of the centre of the mechanism. The two alternate plates 45, 47 have respective associated spring loaded detents similar to the detent 61, shown in FIG. 2, in the opposite side of the body 28, that is at the opposite side of the centre of the mechanism. These engage in notches equivalent to those identified at 62, 63, 64 in FIG. 2, in these plates 45, 47 respectively. This arrangement of alternate detents at opposite sides of the control rod 29, is desirable, since it is inconvenient to provide four detents at one side of the control rod for the four plates 45, to 48 respectively, since there is insufficient space for these, if the plates 45 to 48 are to be closely adjacent.

The external profiles of the plates 45 to 48 are moreover, symmetrical about the plane containing the plate of the bolts 49 and 51 and the central rod 29. There are therefore, four sets of three notches 57 to 59 and 62 to 64 and two tongues 27. Those not in use on the plate 46 illustrated, are identified by numerals with the suffix a. The tongues 27 and 27a are at opposite sides of a plane which is perpendicular to the plane containing the axes of the bolts 49 and 51 and the control rod 29. The tongue 27a is moreover, distinguished from the tongue 27 by a notch 65 which is merely provided to allow ready recognition of the orientation of the plate.

Each plate can be fitted into the body in any one of four different positions. With regard to the plate 46, illustrated in FIG. 2, it will be seen that this can be fitted with any one of its four sets of three notches engaging the detent 61.

In two of the possible positions, the thistle shaped opening 54 is as indicated in FIG. 2, whereas in the other two possible positions, it is inverted so that the other end of the member 42 engages in the narrower portion thereof.

Axial movement of the control rod 29, therefore selects the plate which is to be actuated and angular movement of the control rod moves the plate linearly between three possible positions. It is, however, only possible to move the control rod axially when all of the plates are in their central neutral positions as shown, since the shoulders 55, 56, of the thistle shaped openings are only aligned from plate to plate in that position.

Axial and angular movement of the control rod 29, is accomplished through the control lever 37 and in the FIG. 3 example, such movement is resisted in one direction by a pair of concentric coiled compression springs 66, 67 housed in the end caps 33 of the body 28. The control rod 29 has an annular groove 68 containing a circular wire clip 69 against which an abutment ring 71 for the outer spring 66 is urged. There is moreover, another groove 72, in the control rod 29, containing another circular wire clip 73. Against this, one end of inner spring 67 acts. The opposite ends of both the springs 66, 67, act against a ring 74, which locates against a circular wire clip 75, located in an annular groove in the end cap 33. Thus relative movement between the control rod and the end cap is resisted by the springs. However, since the free length of the outer one of the springs 66, allows it to disengage the abutment ring 71, before the smaller spring 67, is free from compressive stress, the final travel in one direction is under the influence of the inner one of the springs only.

This arrangement provides resistance to movement in the opposite direction against one of the springs and greater resistance to movement in the same direction against both of the springs, after a predetermined travel of the control rod.

An alternative spring arrangement is shown in FIG. 6. An end cap 76, replaces the end cap 33, these being inter-changeable. This forms a sleeve surrounding the end portion of the control rod 29 which is modified by the addition of a wide annular groove 77 with chamfered side faces. Engaging in the groove 77 is a spring loaded ball 78, which is located in a bore in the end cap 76 extending transversely of the axis of the control rod 29. The width of the groove 77, is greater than the portion of the ball 78 located in it and movement of the control rod can therefore take place within limits defined by the points of engagement of the ball 78 with the edges of the groove 77. However, the ball can be forced against its spring 79 to allow passage of the control rod 29, the ball riding up one of the chamfered edges of the groove 77, to provide resistance which can be felt by the operator.

At the other end of the body 28, shown in FIG. 3, the end cap 34 contains a reverse light switch 81, which is provided with a spring loaded plunger 82. This plunger engages with the end of the control rod 29, when this reaches the position of the plunger 82. Inward movement of the plunger allows the switch to actuate an associated lamp.

In FIGS. 8 and 9, there is shown an alternative arrangement wherein the control rod 29, has at its end, an enlarged ring 83. The switch in this example is arranged to complete an associated circuit to light a lamp upon outward movement of its plunger 82. The ring 83, is secured to the end of the control rod 29 by a rivet 84.

FIGS. 10 and 11 illustrate a further alternative construction wherein the control rod has a ring 85, with a segment cut out of it. The switch plunger 82 engages with the control rod in such a way that the angular position of the control rod 29, as well as its axial position, controls the actuation of the switch, and thus an associated lamp. The switch may be used, in an alternative electrical circuit, for a purpose other than control of a lamp.

FIG. 7, illustrates an alternative end cap which is inter-changeable with the end cap 34. This is a casing 86, into which the control rod 29 extends. Fixed to the end of the control rod is a crank arm 87, having an opening 88, in which engages a part-spherical end 89, of a crank arm 91, mounted upon a shaft 92, which extends in a direction perpendicular to the axis of the control rod 29. The shaft 92, moreover, communicates externally of the control mechanism with a remote control device which may be a control lever for gear selection. This arrangement however, reverses the actuating movements of the part. Thus, angular movement of the shaft 92, results in axial movement of the control rod 29 and axial movement of the shaft 92 results in angular movement of the control rod 92.

This mechanism is capable of being adapted to suit a large number of different gear box actuating linkages, as well as a number of different gear selection patterns. Furthermore different numbers of gears can be selected.

Direct operation for the remote control linkages can be accommodated by means of the replaceable end caps. Where no control lever 37 is used but another form is fitted, the cranked portion of the control rod may be omitted and the seating 41 for the control lever may be replaced by a cap which seals the opening which it occupies.

Other spring loaded mechanisms for imparting some feel to the operator through the control lever can be incorporated, giving spring resistance at certain points or over the whole of the travel in one or both directions.

We claim:

1. A control mechanism for a gear box comprising a body, a control rod in the body and connectible to an external control lever, the control rod carrying an actuating member and being movable angularly as well as axially in the body, the body containing a number of independently movable plates which are arranged transversely of the length of the control rod, axial movement of the rod between successive positions serving to align the actuating member with respective plates, and angular movement of the rod causing the actuating member to produce linear movement of a plate which is aligned therewith, said plates having respective operating elements arranged to engage gear ratio selector devices in the gear box, said plates being identical and each of which is symmetrical about a first plane containing the axis of the control rod and containing the center of a shaped hole through which the control rod passes, each of said plates having pairs of tongues arranged to engage gear ratio selector devices, said tongues being disposed symmetrically on a respective plate at opposite sides of said first plane, said control rod having portions which are alternatively engageable with a recess formed in the periphery of said hole through which said control rod passes.

2. A control mechanism as claimed in claim 1, in which the plates are mounted in parallel with one another and are perpendicular to the longitudinal axis of the control rod.

3. A control mechanism as claimed in claim 1 in which each of the plates is also symmetrical about a second plane perpendicular to said first plane, except for the shaped hole for the control rod and each plate has four sets of elements engageable with a member on the body whereby movement of the plate away from a selected position is resisted, orientation of the plate determining which of the four sets is so engageable.

4. A control mechanism as claimed in claim 3, in which the sets of elements are respective sets of notches engageable by a spring loaded detent carried in the body of the mechanism.

5. A control mechanism as claimed in claim 1 wherein the control rod has means whereby linear movement is always restricted to a single plate.

6. A control mechanism as claimed in claim 5, in which the means for restricting linear movement to a single plate comprises interengaging formations on the control rod and plates whereby angular movement of the control rod produces no movement of any of the plates but said single plate.

7. A control mechanism as claimed in claim 1 wherein the control rod is moved by a control lever engaged in a cranked portion of the control rod.

8. A control mechanism as claimed in claim 7, which the control rod is adaptable for alternative types of engagement means with the control lever.

9. A control mechanism as claimed in claim 1 in which the control rod is urged by spring means in at least one axial direction.

10. A control mechanism as claimed in claim 9, in which the spring means comprises two springs of which, over a portion of the travel of the control rod, only one is operatively stressed and over a further portion both springs are operatively stressed.

11. A control mechanism as claimed in claim 1 in which the control rod actuates an electrical switch at a predetermined position in its travel.

12. A control mechanism as claimed in claim 11, in which axial movement of the control rod actuates the electrical switch.

13. A control mechanism as claimed in claim 11, in which axial or angular movement of the control rod can actuate the electrical switch.

* * * * *